US008902521B2

(12) United States Patent
Huang

(10) Patent No.: US 8,902,521 B2
(45) Date of Patent: Dec. 2, 2014

(54) LENS MODULE

(75) Inventor: Shan-Fu Huang, Taipei Hsien (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 1195 days.

(21) Appl. No.: 12/764,100

(22) Filed: Apr. 21, 2010

(65) Prior Publication Data

US 2011/0149417 A1    Jun. 23, 2011

(30) Foreign Application Priority Data

Dec. 18, 2009    (TW) .............................. 98143555 A

(51) Int. Cl.
*G02B 7/02* (2006.01)
(52) U.S. Cl.
CPC ............... *G02B 7/021* (2013.01); *G02B 7/025* (2013.01)
USPC .......................................... 359/819; 359/811
(58) Field of Classification Search
USPC ......... 359/811, 819, 820, 823–825, 642, 738, 359/694–701; 348/335, 374; 396/65, 89, 396/144, 529
See application file for complete search history.

(56) References Cited

U.S. PATENT DOCUMENTS

| 5,218,484 | A | * | 6/1993 | Terai | 359/823 |
| 5,249,082 | A | * | 9/1993 | Newman | 359/813 |
| 5,774,282 | A | * | 6/1998 | Kohmoto et al. | 359/823 |
| 6,441,976 | B1 | * | 8/2002 | Okorocha | 359/820 |
| 7,289,282 | B2 | * | 10/2007 | Matsushima | 359/819 |
| 7,589,922 | B2 | * | 9/2009 | Higuchi | 359/824 |

FOREIGN PATENT DOCUMENTS

| CN | 101105563 A | 1/2008 |
| CN | 101196603 A | 6/2008 |
| CN | 101377560 A | 3/2009 |

* cited by examiner

*Primary Examiner* — Loha Ben
(74) *Attorney, Agent, or Firm* — Novak Druce Connolly Bove + Quigg LLP

(57) ABSTRACT

A lens barrel forming a substantially annular positioning portion on the inner surface thereof is provided. As such, a lens received in the lens barrel can be positioned by the positioning portion to a predetermined longitudinal position of the lens barrel and to be coaxial with the lens to form a lens module and to archive an excellent coaxiality between the lens barrel and the lens.

12 Claims, 4 Drawing Sheets

LENS MODULE

BACKGROUND

1. Technical Field

The present disclosure relates to a lens module.

2. Description of Related Art

Current lens modules often include a lens barrel and a set of lenses and spacer rings received in the lens barrel. The lenses and spacer rings are often held merely by a structure engagement with the inner surface of the lens barrel. However, the lenses and the spacer rings may mismatch with the lens barrel. In addition, current assembly technologies can not assure that the lenses and spacer rings are precisely assembled into the lens barrel. The lenses and the spacer ring may slide or incline away from desired positions upon assembly. As such, it is difficult to obtain an excellent coaxiality of the lens module.

Therefore, it is desirable to provide a lens module, which can overcome the above-mentioned limitations.

BRIEF DESCRIPTION OF THE DRAWINGS

Many aspects of the present embodiments should be better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the several views.

DETAILED DESCRIPTION

Embodiments of the present lens module will now be described in detail with reference to the drawings.

Figure 1:
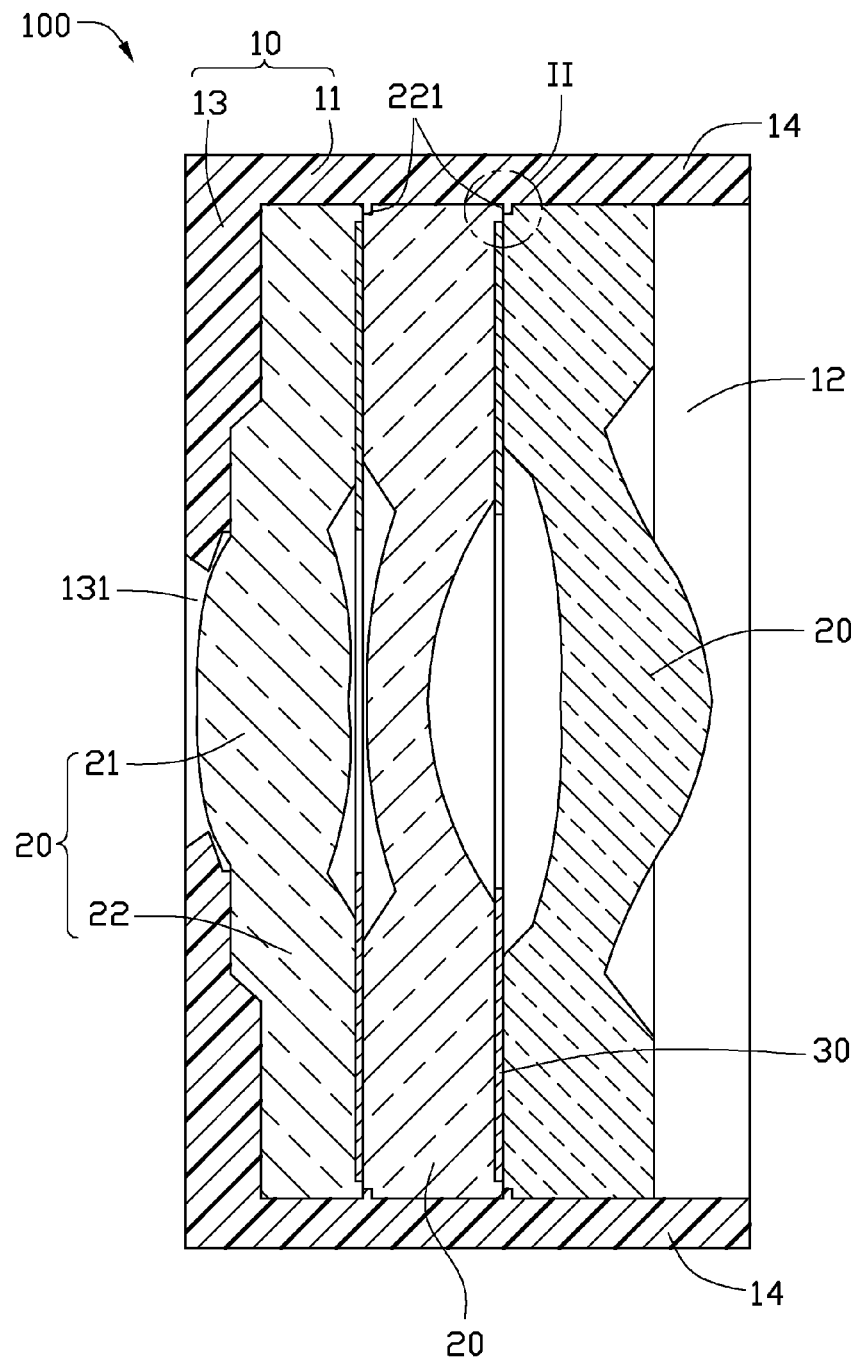
FIG. 1 is a cross-sectional view of a lens module, according to one embodiment.
Figure 2:
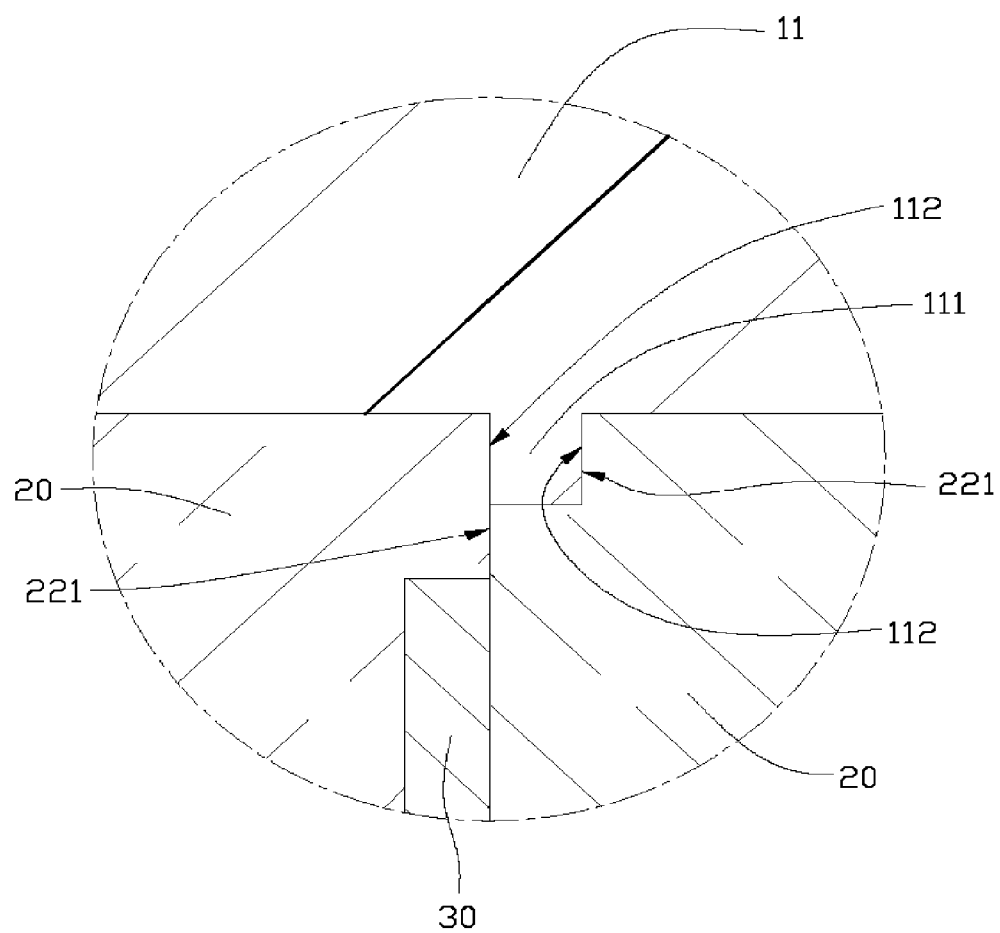
FIG. 2 is an enlarged view of a portion II of FIG. 1.
Figure 3:
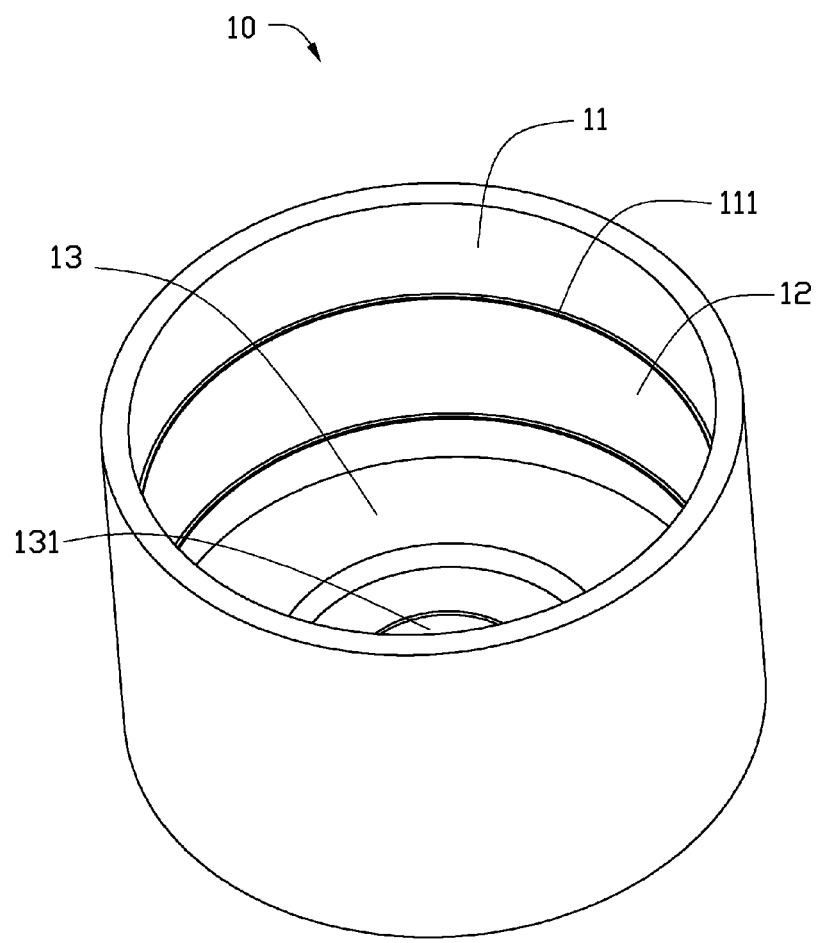
FIG. 3 is an isometric view of a lens barrel of the lens module of FIG. 1.

Referring to FIGS. 1-2, a lens module 100, according to one embodiment, includes a lens barrel 10, three lenses 20, and two aperture sheets 30. The lenses 20 and the aperture sheets 30 are alternately arranged and received in the lens barrel 10

Also referring to FIG. 2, the lens barrel 10 includes a substantially tube-shaped sidewall 11 and an annular aperture plate 13 positioned at the object-side end of the sidewall 11. The sidewall 11 and the aperture plate 13 can be integrally formed and cooperatively define an interior space 12 of the lens barrel 10. The aperture plate 13 defines an aperture opening 131 generally through the center thereof to allow light rays from objects of interest (not shown) entering the lens barrel 10 (i.e., the space 12). In particular, the opening 131 tapers towards the image-side of the lens barrel 10 which is beneficial for controlling incident angle of the light rays entering thereunto.

Figure 4:
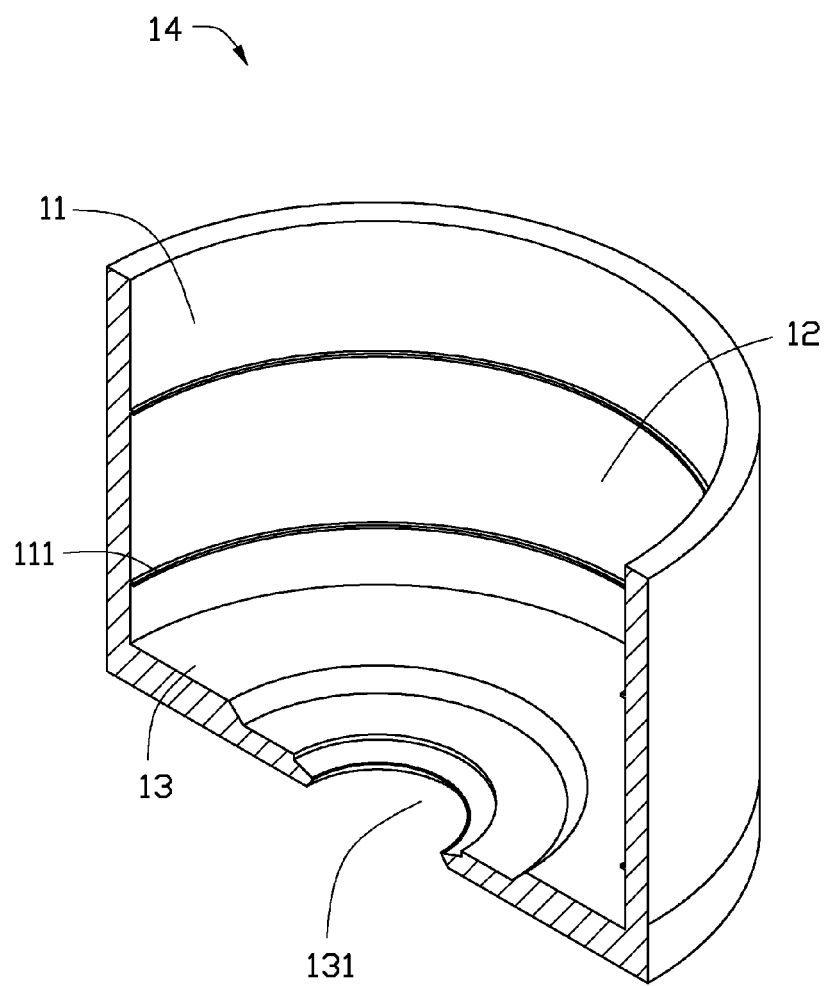
FIG. 4 is an isometric view of a half of the lens barrel of FIG. 3.

Referring to FIG. 4, the lens barrel 10 is cut into two halves 14 which are substantially identical to each other and can be united as one piece (i.e. the lens barrel 10) via structure engagement, adhesive, or welding which is beneficial for assembly of the lens module 100 (see below).

The lens barrel 10 also includes two positioning portions 111 forming on the inner surface of the sidewall 11. Each positioning portion 111, cooperating with other portions of the lens barrel 10, is configured to position a corresponding lens 20 to desired longitudinal and transversal position in the lens barrel 10. In particular, each positioning portion 111 is an annular configuration and formed at an appropriate longitudinal position of the sidewall 11. As such, the positioning portion 111 can position the corresponding lens 20 at a desired longitudinal position in the lens barrel 10. Each positioning portion 111 also forms a substantially annular contact surface 112. The contact surface 112 is for contacting the corresponding lens 20 for positioning (i.e., orienting) the contacted lens 20 to a desired transversal position of the lens barrel 10 (making the lens 20 coaxial with the lens barrel 10).

The positioning portion 111 can be a continuous ring or three or more discontinuous blocks which may be equidistantly distributed around the circumferential direction of the inner surface of the sidewall 11. In the illustrated embodiment, the positioning portions 111 are continuous rings.

Each lens 20 includes a central optical portion 21 and an annular non-optical portion 22 surrounding the optical portion 21. The optical portions 21 are for forming the light rays entering the lens barrel 10 into optical images (not shown). The non-optical portions 22 are for the engagement with the lens barrel 10 or other elements of the lens module 100 (e.g., the aperture sheets 30).

Each non-optical portion 22 forms a substantially annular positioning surface 221 adjacent to the periphery portion thereof for contacting the corresponding contact surface 112. As such, the lens 20 is positioned in the transversal direction of the lens barrel 10 (i.e., oriented) to be coaxial with the lens barrel 10.

In this embodiment, the aperture plate 13 and a positioning portion 111 adjacent thereto cooperatively position the lens 20 adjacent to the aperture plate 13. The two positioning portions 111 position a middle lens 20. The positioning portion 111 away from the aperture plate 13 positions the lens 20 away from the aperture plate 13. As such, each positioning portion 111 forms two substantially opposite contact surface 112. The middle lens 20 forms two positioning surfaces 221. The other two lenses 20 form only one positioning surface 221.

The contact surfaces 112 and the positioning surfaces 221 are substantially perpendicular to the optical axis of the lens barrel. As such, upon assembly, the lenses 20 are oriented to be coaxial with the lens barrel 10. However, it is noteworthy that other than perpendicular to the optical axis of the lens barrel 10, each corresponding contact surface 112 and positioning surface 221 also can incline at the same angle with respect to the optical axis. As such, upon assembly, the corresponding lens 20 can also be orient to be coaxial with the optical axis.

The aperture sheets 30 are annular and are made of an opaque material, such as polyethylene terephthalate (PET) or polycarbonate (PC), to block light rays transmitted in the lens barrel 10 (i.e., the space 12). Each aperture sheet 30 is interleaved between two adjacent lenses 20. The aperture sheets 30 are of a thickness from about 0.3 millimeter (mm) to about 0.5 mm. The aperture sheets 30 may be of different inner diameters to meet aperture value requirements of the lens module 100.

It is noteworthy that the numbers of the lenses 20, the aperture sheets 30, and the positioning portions 111 are not limited to this embodiment, but can be set depending on requirements.

In assembly, the lenses 20 and the aperture sheets 30 are firstly placed to desired positions of one half 14 of the lens barrel 10. Then, the other half 14 is united to the half 14 with the lenses 20 and the aperture sheets 30. Thus, the lens module 100 is obtained.

It will be understood that the above particular embodiments and methods are shown and described by way of illustration only. The principles and the features of the present disclosure may be employed in various and numerous embodiment thereof without departing from the scope of the disclosure as claimed. The above-described embodiments illustrate the scope of the disclosure but do not restrict the scope of the disclosure.

What is claimed is:

1. A lens module comprising:
a lens barrel having a cylindrical inner surface;
a substantially annular positioning portion formed on the inner surface of the lens barrel; and
a lens received in the lens barrel and positioned by the positioning portion and coaxially aligned with the lens barrel;
wherein the lens barrel comprises two combined halves.

2. The lens module of claim 1, wherein the two halves are combined via a process selected from the group consisting of structure engagement, adhesive, and welding.

3. The lens module of claim 1, wherein the positioning portion comprises a continuous ring.

4. The lens module of claim 1, wherein the lens comprises a central optical portion and a non-optical portion surrounding the optical portion, the non-optical portion contacts the positioning portion.

5. The lens module of claim 1, wherein the positioning portion comprises a contact surface, the lens comprises a positioning surface, and the contract surface and the positioning surface are perpendicular to the optical axis of the lens barrel.

6. The lens module of claim 1, further comprising at least one lens and at least one more annular positioning portion to position the at least one more lens.

7. The lens module of claim 6, wherein the lens barrel comprises an annular aperture plate position at the object-side end thereof, the lens is positioned by the aperture plate and the substantially annular positioning portion.

8. The lens module of claim 6, wherein the at least one more lens interposed between the substantially annular positioning portion and the at least one more annular positioning portion, and is positioned by the two annular positioning portions.

9. The lens module of claim 6, further comprising at least one more lens and at least two annular opaque aperture sheets, each aperture sheet being sandwiched between two adjacent lenses.

10. The lens module of claim 9, wherein the aperture sheets are made of a material selected from the group consisting of poly ethylene terephthalate and poly carbonate.

11. Then lens module of claim 9, wherein the aperture sheets have a thickness of about 0.3 mm to about 0.5 mm.

12. A lens module comprising:
a lens barrel having a cylindrical inner surface;
a plurality of annular protrusions formed on the inner surface of the lens barrel; and
a plurality of lenses received in the lens barrel, each lens having a circumferential surface contacting the inner surface, each protrusion arranged at an interface between two adjacent lenses.

* * * * *